(12) United States Patent
Lee et al.

(10) Patent No.: US 8,878,879 B2
(45) Date of Patent: Nov. 4, 2014

(54) APPARATUS, METHOD AND COMPUTER READABLE RECORDING MEDIUM FOR DISPLAYING CONTENT

(75) Inventors: Joong Ho Lee, Seoul (KR); Ji Hyung Park, Seoul (KR); Dong Wook Yoon, Busan (KR)

(73) Assignee: Korea Institute of Science & Technology, Seoul (KR)

( * ) Notice: Subject to any disclaimer, the term of this patent is extended or adjusted under 35 U.S.C. 154(b) by 217 days.

(21) Appl. No.: 13/306,853

(22) Filed: Nov. 29, 2011

(65) Prior Publication Data

US 2012/0293553 A1 Nov. 22, 2012

(30) Foreign Application Priority Data

May 18, 2011 (KR) ........................ 10-2011-0046658

(51) Int. Cl.
*G09G 5/00* (2006.01)
*G06F 3/0485* (2013.01)
*G06F 3/0488* (2013.01)
*G06F 3/0483* (2013.01)
*G06F 3/0482* (2013.01)

(52) U.S. Cl.
CPC .......... *G06F 3/04883* (2013.01); *G06F 3/0485* (2013.01); *G06F 2203/04806* (2013.01); *G06F 3/0483* (2013.01); *G06F 3/04886* (2013.01); *G06F 3/0482* (2013.01)
USPC ........... 345/662; 345/173; 345/174; 345/175; 345/671; 715/702; 715/810

(58) Field of Classification Search
CPC .............. G09G 2340/0407; G09G 2340/0414; G09G 2340/0421; G06T 3/40; G06F 3/0481

USPC ........... 345/173–175, 662, 671; 715/702, 810
See application file for complete search history.

(56) References Cited

U.S. PATENT DOCUMENTS

| | | | |
|---|---|---|---|
| 8,291,350 B1* | 10/2012 | Park et al. ...................... | 715/863 |
| 2008/0100591 A1* | 5/2008 | Nezu et al. ..................... | 345/173 |
| 2009/0241054 A1* | 9/2009 | Hendricks ...................... | 715/776 |
| 2009/0322699 A1* | 12/2009 | Hansson ........................ | 345/174 |
| 2010/0125786 A1* | 5/2010 | Ozawa et al. ................... | 715/702 |
| 2010/0248788 A1* | 9/2010 | Yook et al. ..................... | 455/566 |
| 2011/0041094 A1* | 2/2011 | Robert et al. .................. | 715/810 |
| 2011/0173539 A1* | 7/2011 | Rottler et al. .................. | 715/727 |
| 2011/0193804 A1* | 8/2011 | Shin et al. ..................... | 345/173 |
| 2011/0202837 A1* | 8/2011 | Fong et al. ..................... | 715/702 |
| 2012/0011437 A1* | 1/2012 | James et al. ................... | 715/702 |
| 2012/0210275 A1* | 8/2012 | Park et al. ..................... | 715/810 |
| 2012/0272186 A1* | 10/2012 | Kraut ............................ | 715/810 |

FOREIGN PATENT DOCUMENTS

| | | |
|---|---|---|
| KR | 10-2008-0054346 A | 6/2008 |
| KR | 10-2010-0048372 A | 5/2010 |

* cited by examiner

*Primary Examiner* — Xiao Wu
*Assistant Examiner* — Todd Buttram
(74) *Attorney, Agent, or Firm* — Fenwick & West LLP

(57) ABSTRACT

A method and apparatus for displaying content and a computer-readable recording medium thereof are disclosed. The method for displaying content includes: generating a page corresponding to a content file included in a folder; generating a folder display portion corresponding to the folder and an information display layer including the page; outputting the information display layer on a content display apparatus; sensing touch of the content display apparatus; and changing an output format of the information display layer based on the sensed touch.

14 Claims, 12 Drawing Sheets

601

701: COORDINATES (x1, y1)
     OF LEFT UPPER END OF PAGE

702: COORDINATES (x2, y2)
     OF RIGHT LOWER END OF PAGE

APPARATUS, METHOD AND COMPUTER READABLE RECORDING MEDIUM FOR DISPLAYING CONTENT

CROSS-REFERENCE TO RELATED APPLICATION

This application claims priority to Korean Patent Application No. 10-2011-0046658, filed on May 18, 2011, and all the benefits accruing therefrom under 35 U.S.C. §119, the contents of which in its entirety are herein incorporated by reference.

BACKGROUND

1. Field

The present disclosure relates to a method for displaying content and, more particularly, to an apparatus and method for displaying content using an information display layer and a computer-readable recording medium thereof.

2. Description of the Related Art

The existing information display screen for displaying content provides thumbnail images in order to display a large amount of content on a restricted screen. In addition, a scroll window may be used in order to enlarge a screen for displaying content. Further, a large amount of content may be displayed on a three-dimensional space using various methods.

A thumbnail method has advantages that a screen is efficiently used and an information preview function is performed, but has disadvantages that the sizes of thumbnail images may not be individually controlled and two or more pieces of content may not be adjacently compared. In addition, in the thumbnail method, since the number of pieces of content which may be displayed on a screen is restricted, a scroll method for space movement is necessary.

In the case where information is displayed on a three-dimensional space, since a space larger than a space for displaying thumbnail images is generated and content is arranged on three-dimensional coordinates, a user may not intuitively perceive the content. As the amount of information displayed on the three-dimensional space is increased, visibility is decreased.

SUMMARY

The present disclosure is directed to maximize the number of pieces of content displayed on a restricted screen.

The present disclosure is also directed to rapidly and easily control a large amount of content such that a user intuitively perceives the content.

In one aspect, there is provided a method for displaying content, including: generating a page corresponding to a content file included in a folder; generating a folder display portion corresponding to the folder and an information display layer including the page; outputting the information display layer on a content display apparatus; sensing touch of the content display apparatus; and changing an output format of the information display layer based on the sensed touch.

The generating the information display layer may further include aligning the folder display portion and the page of the information display layer in one direction.

The generating the information display layer may further include generating a plurality of information display layers.

In another aspect, there is provided a content display apparatus, including: a display unit configured to display an information display layer including a folder display portion corresponding to a folder and a page corresponding to a content file included in a folder; a touch sensor configured to sense touch of the content display apparatus; and a conversion controller configured to change an output format of the information display layer based on the sensed touch.

The display unit may align and output the folder display portion and the page of the information display layer in one direction.

The display unit may output a plurality of information display layers.

In another aspect, there is provided a computer-readable recording medium having recorded thereon a computer program for executing a method for displaying content, including: generating a page corresponding to a content file included in a folder; generating a folder display portion corresponding to the folder and an information display layer including the page; outputting the information display layer on a content display apparatus; sensing touch of the content display apparatus; and changing an output format of the information display layer based on the sensed touch.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
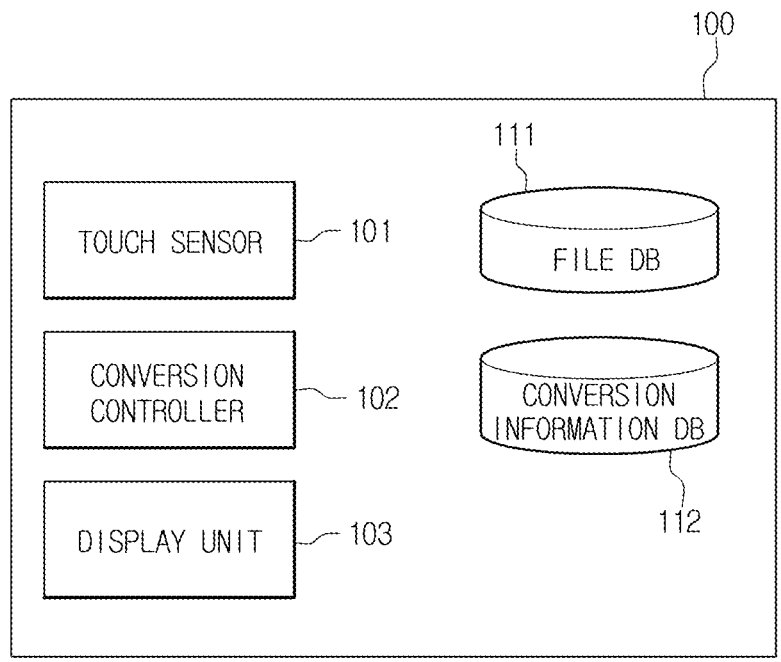
FIG. 1 is a diagram showing an internal configuration of an apparatus for displaying content according to an embodiment of the present disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

FIG. 1 is a diagram showing an internal configuration of an apparatus 100 for displaying content according to an embodiment of the present disclosure. The content display apparatus 100 may include a touch sensor 101, a conversion controller 102, a display unit 103, a file database (DB) 111 and a conversion information DB 112.

Content described in one embodiment of the present specification is multimedia content including an image, a video, or the like, but the present disclosure is not limited thereto.

All or part of content may be displayed according to content types. For example, if content is an image, the entire image or a part of the image may be displayed on a screen. In another embodiment, if content is a video, a captured scene of a representative screen may be used as a part of content displayed on the content display apparatus and the reproduced video may be displayed on the content display apparatus. Content is displayed in correspondence with actual content and an object corresponding to (selected or extracted from) content is referred to as a "page" in the present specification.

The touch sensor 101 detects or senses touch of the content display apparatus. The touch sensor 101 receives user input based on haptic or tactile touch. In one embodiment, a touch point between the touch sensor 101 and the user corresponds to a finger of the user.

The touch sensor 101 includes various software components for performing various operations such as an operation for determining whether the content display apparatus is touched, an operation for determining whether a touch point is moved, an operation for tracking movement of a touch point, and an operation for determining whether a touch operation is stopped. The operation for determining whether the touch point is moved may include operations for determining the speed (size), the velocity (size and direction) and/or acceleration (change in size and/or direction) of the touch point. Such an operation is applicable to single touch (touch of one finger) or multi-touch (touch of a plurality of fingers). A capacitive technology, a resistive technology, an infrared technology and a surface acoustic wave technology may be used in the touch sensor 101, and touch, touch point movement or touch stop may be sensed using other components for determining one or more touch points.

In the embodiment of the present disclosure, movement of a touch point is divided into one-point touch and two-point touch (multi-touch). One-point touch is defined as instantaneous touch if a touch property is less than a predetermined touch property threshold and is defined as continuous touch if a touch property is greater than a predetermined touch property threshold. The touch property threshold may be determined according to the speed (size) and the velocity (size and direction) of a touch point. In addition, touch information (e.g., information about a page including a touch point along with motion information and information about an information display layer including a page) may be stored in the conversion information DB 112.

The conversion controller 102 serves to change an output format of an information display layer based on touch information sensed by the touch sensor 101. The output format changed according to touch information will be described in detail below.

The display unit 103 serves to output a folder display portion corresponding to a folder and an information display layer including a page corresponding to a content file in a folder. That is, the display unit 103 visually displays the page to the user. In the present embodiment, the output format may be changed by conversion information stored in the conversion information DB. Although a liquid crystal display (LCD) technology or a laser phosphor display (LPD) technology may be used in the display unit 103, other display technologies may be used in other embodiments.

In one embodiment of the present disclosure, the display unit 103 may be combined with the touch sensor 101. That is, a screen may perform the function of the touch sensor 101. In general, this configuration may be implemented by a touch screen. The touch screen simultaneously provides an input interface (touch sensor) and an output interface (display unit) between the apparatus and the user. In another embodiment, the touch sensor 101 may be transparent and flat and a display unit 103 may be formed on a lower end of the touch sensor 101 with the same area.

The file DB 111 serves to store content. In the present disclosure, a database includes not only a narrow-sense database but also a broad-sense database including data record based on a file system. A set of logs may be included in the database of the present disclosure if data may be retrieved and extracted. In one embodiment, the file DB stores content in a tree structure of folders. That is, since files are stored in a hierarchical structure, content of a single folder may be displayed and higher folders of content files may be represented in an information display layer. The file DB 111 may store the above-described page. All or part of content may be represented by the page according to content types. For example, if content is an image, the entire image or a part of the image may be displayed on a screen. In another embodiment, if content is a video, a captured scene of a representative screen may be used as a part of content displayed on the content display apparatus and the reproduced video may be displayed on the content display apparatus. The conversion information DB 112 serves to store output information changed by the conversion controller 102. In addition, the conversion information DB 112 may store touch information (e.g., information about a page including a touch point along with motion information and information about an information display layer including a page) generated by the touch sensor 101. The display unit 103 outputs the page using the screen display method and the touch information stored in the conversion information DB 112.

Figure 2:
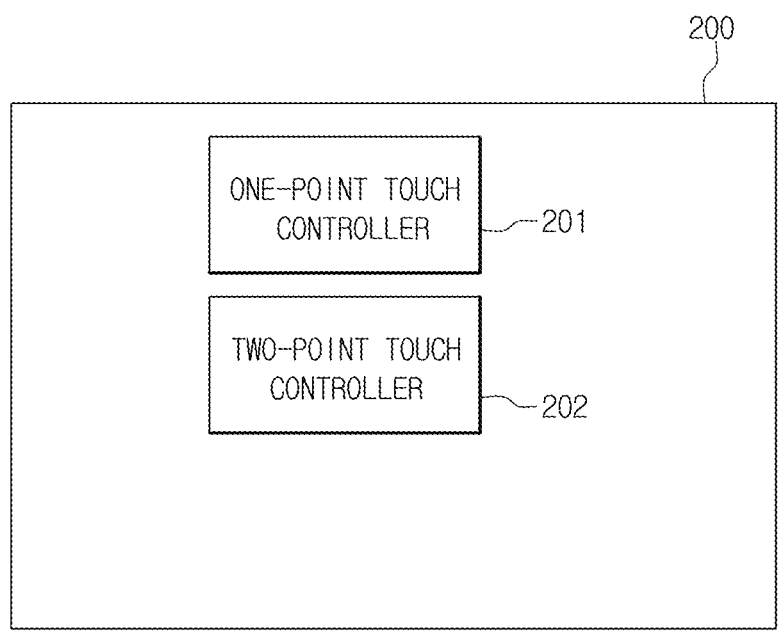
FIG. 2 is a diagram showing an internal configuration of a conversion controller of an apparatus for displaying content according to an embodiment of the present disclosure.

FIG. 2 is a diagram showing an internal configuration of a conversion controller 102 of a content display apparatus according to an embodiment of the present disclosure. The conversion controller 102 may include a one-point touch controller 201 and a two-point touch controller 202.

The one-point touch controller 201 changes the output format of the display unit if one point is touched. One-point touch is defined as instantaneous touch if a touch property is less than a predetermined touch property threshold and is defined as continuous touch if a touch property is greater than a predetermined touch property threshold. The touch property threshold may be determined according to the speed (size) and the velocity (size and direction) of a touch point.

The two-point touch controller 202 changes the output format of the display unit if two points are touched. In the present embodiment, two-point touch is applied to only the case where two points are included in the same information display layer. If two points are respectively included in different information display layers, each of the two points may be perceived as one point touched in each information display layer. In case of two-point touch, a determination as to whether two points are touched in a single page is first made. If two points are touched in the single page, the screen output format is changed depending on whether the touched two points are moved at the same velocity (size and direction) or at different velocities. If the two points are not touched in the single page, that is, if the two points are touched in different pages, a screen output format is separately changed.

Figure 3:
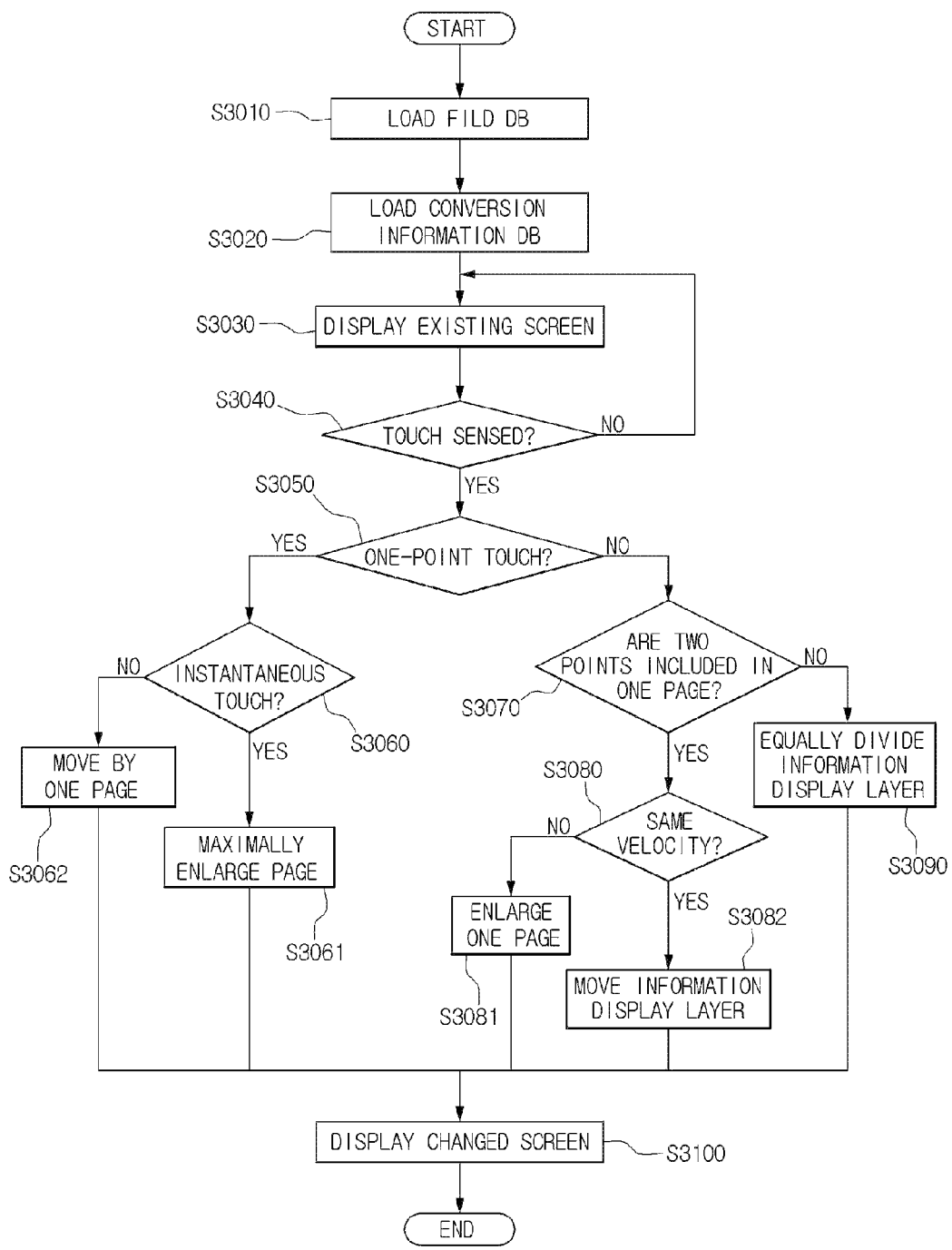
FIG. 3 is a flowchart illustrating a method for displaying content according to an embodiment of the present disclosure.

FIG. 3 is a flowchart illustrating a method for displaying content according to an embodiment of the present disclosure.

The content display apparatus loads and checks file data from the file DB (S3010). In one embodiment, folder information and file information stored in the file DB may be checked. The content display apparatus generates a folder display portion corresponding to a folder and generates a page corresponding to a file using all or part of the loaded file information (not shown). In one embodiment, the folder display portion and the page of the information display layer may be aligned in one direction, that is, in a horizontal direction or a vertical direction. Although the generated page may be stored in the file DB in one embodiment, a storage unit for storing the page is not limited to the file DB. The content display apparatus loads the existing conversion information stored in the conversion information DB (S3020) and outputs an information display layer including the folder display portion and the page on the screen (S3030). If the existing conversion information is not present, initialization is performed, that is, the information display layer is equally or randomly divided so as to output the folder display portion and the page. The content display apparatus always waits for a touch operation, maintains the existing screen if a touch operation is not performed, and determines a screen display method of the page according to touch velocity (size and direction) (S3040).

If a one-point touch operation is performed (S3050), it is determined whether or not touch is instantaneous touch (S3060). If touch is instantaneous touch, one page is maximally enlarged and displayed on the entire screen (S3061) and, if touch is not instantaneous touch, that is, if touch is continuous touch, the size of the page adjacent to the page corresponding to one point is changed and the output position of the page corresponding to one point is moved (S3062).

If the one-point touch operation is not performed (S3070), in the present embodiment, a two-point touch operation is performed. However, the present disclosure is not limited thereto and the present embodiment is applicable to the case where two or more points are touched. If two points included in a single page are touched, the screen display method of the page differs according to movement velocities of two touch points represented two-dimensionally. The velocity includes the size and direction of the movement speed. If the two points represented two-dimensionally are moved at different velocities (size or direction), the touched page is enlarged based on a movement path (S3081). If the velocities of the two points represented two-dimensionally are the same (S3080), the page including the touch points are moved along the information display layer (S3082). In one embodiment, if the two touch points are moved at the same velocity in a direction perpendicular to the information display layer direction, the display position of the information display layer may be changed. If two points included in different pages are touched, the sizes of the pages are equally divided and displayed on the screen (S3090).

Figure 4:
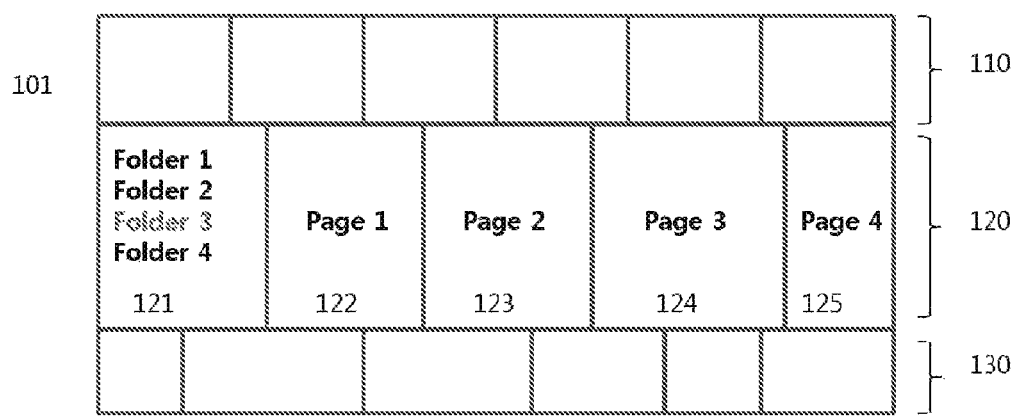
FIG. 4 is a diagram showing an output screen of an apparatus for displaying content according to an embodiment of the present disclosure.

FIG. 4 is a diagram showing an output screen of an apparatus 101 for displaying content according to an embodiment of the present disclosure. Content described in one embodiment of the present disclosure is multimedia content including an image, a video, or the like, but the present disclosure is not limited thereto.

In one embodiment, the content display apparatus represents content using a single information display layer or a plurality of information display layers obtained by dividing the screen of the display apparatus in a horizontal direction. The information display layer may be referred to as a page set including a plurality of pages. FIG. 4 shows three information display layers 110, 120 and 130. In one embodiment, a plurality of pages 122, 123, 124 and 125 included in a folder based on an internal tree structure of a file system may be represented on one information display layer. If another folder among folders represented in the folder display portion 121 is selected, the page of the selected folder may be represented on a content display unit.

Figure 5:
FIG. 5 is a diagram showing an actual output screen of an apparatus for displaying content according to an embodiment of the present disclosure.
Figure 6:
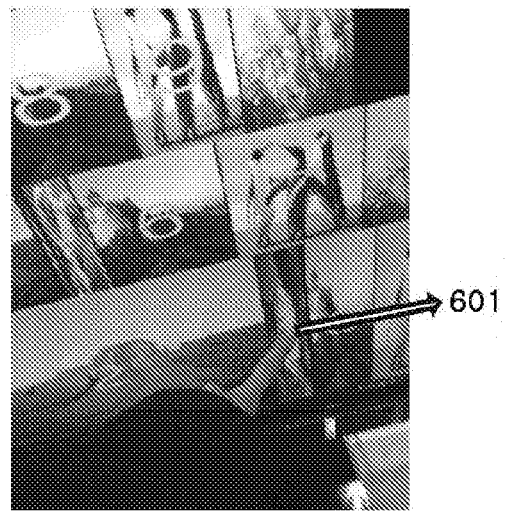
FIG. 6 is a diagram showing user manipulation of an apparatus for displaying content according to an embodiment of the present disclosure.

FIG. 5 is a diagram showing an actual output screen of an apparatus for displaying content according to an embodiment of the present disclosure, and FIG. 6 is a diagram showing user manipulation of an apparatus for displaying content according to an embodiment of the present disclosure. The content display apparatus senses user touch 601 and changes the screen output of the page, which will be described below.

Figure 7:
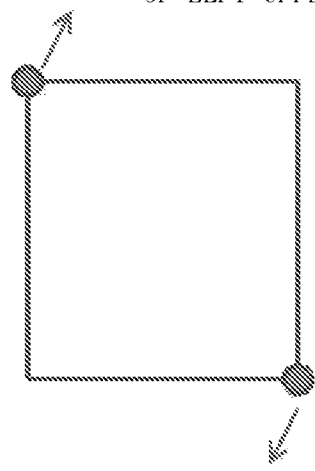
FIG. 7 is a diagram showing the configuration of a page according to an embodiment of the present disclosure.

FIG. 7 is a diagram showing the configuration of a page according to an embodiment of the present disclosure. The page has a rectangular shape. Since all the internal angles between the edges of a rectangle are 90 degrees, if the positions of two diagonally facing points are defined, a unique rectangle may be defined. In the present specification, the screen output method will be described using coordinates 701 of a left upper end and coordinates 702 of a right lower end of a page. In the present specification, although a coordinate system in which the coordinates of a left upper end are set to (0, 0) and the coordinate values are increased toward right and the lower sides is used, the present disclosure is not limited thereto and various coordinate systems may be used.

Figure 8A:
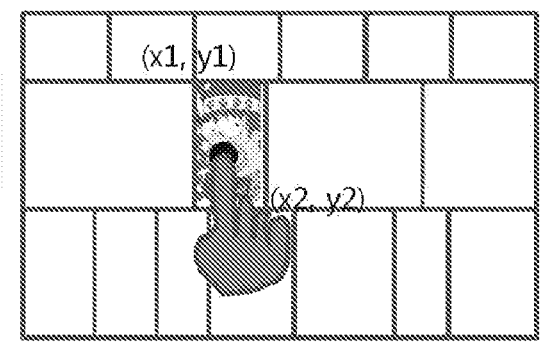
FIGS. 8A and 8B are diagrams showing a screen output method upon one-point instantaneous touch according to an embodiment of the present disclosure.
Figure 8B:
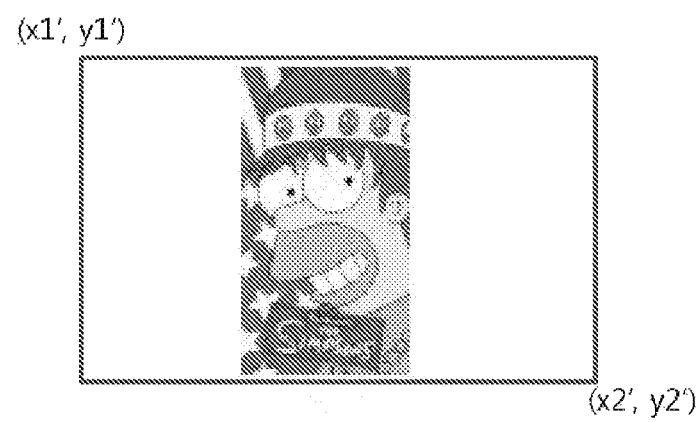

FIGS. 8A and 8B are diagrams showing a screen output method upon one-point instantaneous touch according to an embodiment of the present disclosure. As shown in FIGS. 8A and 8B, in case of one-point instantaneous touch, it is assumed that left upper end coordinates of the page before touch are (x1, y1) and right lower end coordinates of the page before touch are (x2, y2) and that left upper end coordinates of the page after touch are (x1', y1') and right lower end coordinates of the page after touch are (x2', y2'). In FIG. 8A, the width of the screen is longer than the length of the screen and the width of the page is shorter than the length of the page. The touch page is output on the entire screen based on the maximum width and length of the content display apparatus. As shown in FIG. 8B, it is possible to prevent the page from being cut by adjusting the length of the page to the length of the screen. Thus, the coordinates of the page may be represented according to the length of the page.

(x1', y1')=((the width of the entire screen—the width of the page when the page is maximally enlarged)/2, 0)

(x2', y2')=(the width of the entire screen—x1', the length of the entire screen)

If the width of the page is longer than the length of the page when the page is maximally enlarged, the coordinate presentation method opposite to the above case is used. If the page is displayed according to the entire screen without considering the aspect ratio of the original page, the coordinates may be represented as follows.

(x1', y1')=(0, 0)

(x2', y2')=(the width of the entire screen, the length of the entire screen)

Figure 9A:
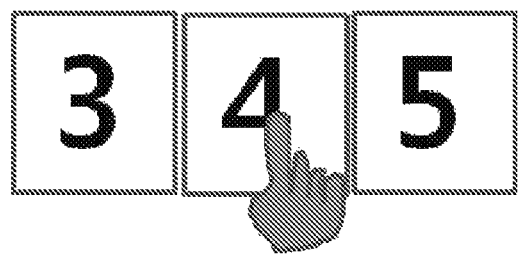
FIGS. 9A, 9B, 9C, 9D, and 9E are diagrams showing a screen output method upon one-point continuous touch according to an embodiment of the present invention.
Figure 9B:
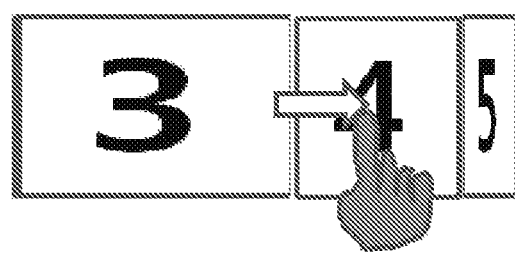
Figure 9C:
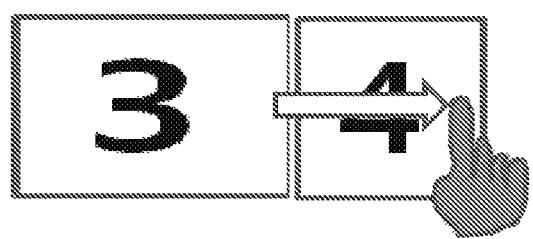

FIGS. 9A, 9B, 9C, 9D, and 9E are diagrams showing a screen output method upon one-point continuous touch according to an embodiment of the present invention. As shown in FIG. 9A, if a middle page "4" is touched and the touch point is continuously moved to the right, the width of a left page "3" is increased without changing the size of the page "4" as shown in FIG. 9B. If the touch point of the page "4" is further moved to the right, a right page "5" is overlapped and is not displayed as shown in FIG. 9C.

Figure 9D:
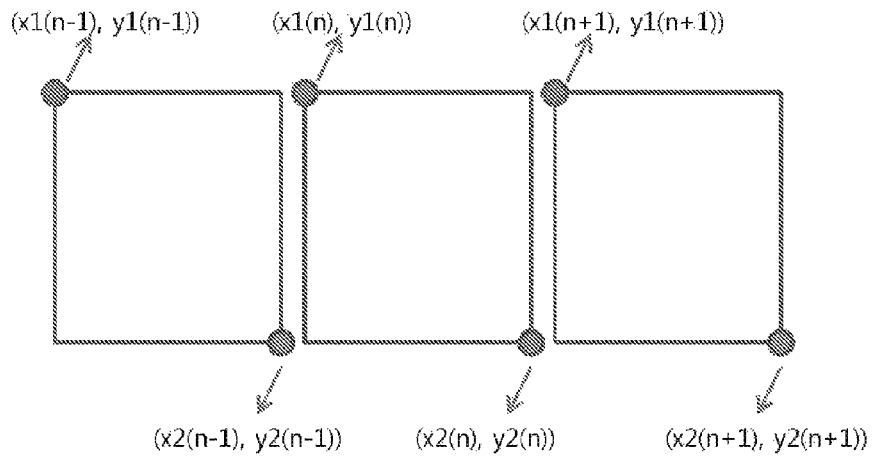
Figure 9E:
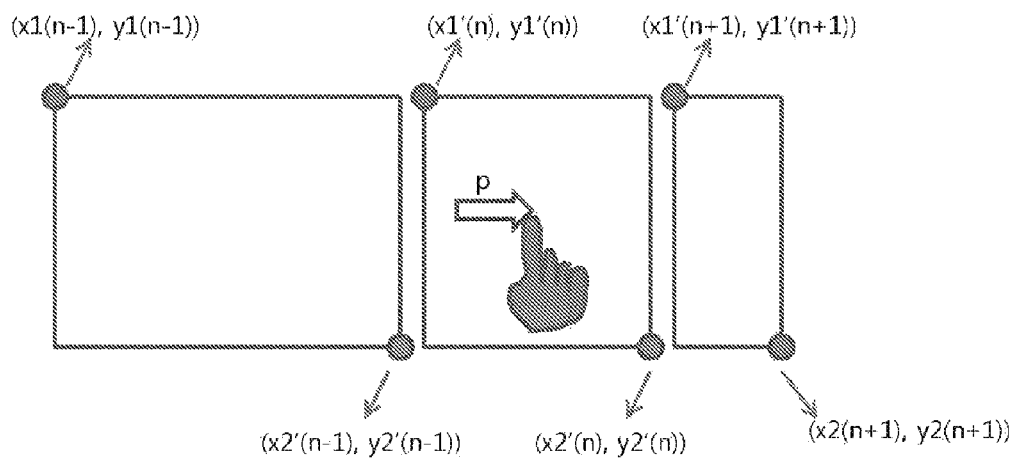

Referring to FIGS. 9D and 9E, in order to prevent the page "4" after the touch point from being changed, $(x1(n)', y1(n)')=(x1(n)+p, y1(n))$ $(x2(n)', y2(n)')=(x2(n)+p, y2(n))$ As the x component of the page "4" is moved, the area of the page "3" is increased.

$(x1(n-1)', y1(n-1)')=(x1(n-1), y1(n-1))$ $(x2(n-1)', y2(n-1)')=(x2(n-1)+p, y2(n-1))$

As the x component of the page "4" is moved, the area of the page "5" is decreased.

$(x1(n+1)', y1(n+1)')=(x1(n+1)+p, y1(n+1))$ $(x2(n)+1', y2(n+1)')=(x2(n+1), y2(n+1))$

In case of x1(n+1)'≥x2(n+1)', the page "5" is not displayed on the screen.

Figure 10A:
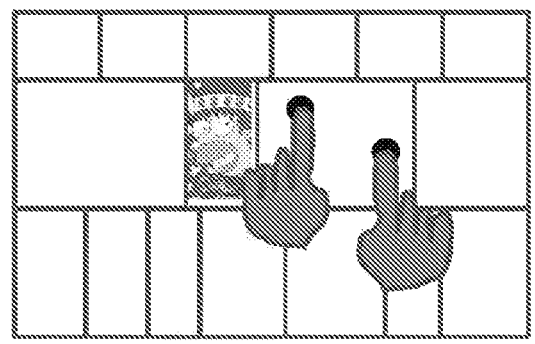
FIGS. 10A, 10B, 10C, and 10D are diagrams showing a screen output method upon touch of two points in different directions according to an embodiment of the present invention.
Figure 10B:
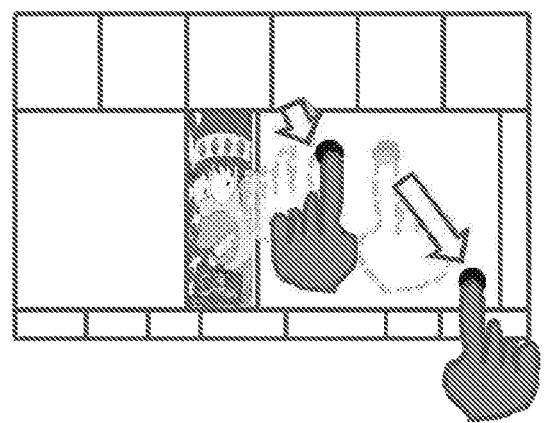

FIGS. 10A, 10B, 10C, and 10D are diagrams showing a screen output method upon touch of two points at different velocities according to an embodiment of the present invention. If two touch points are moved at different velocities in one page, a screen is output while the page is enlarged or reduced and the left and right pages and the upper and lower information layers are increased or decreased. Referring to FIG. 10A, two touch points are selected in one page. Referring to FIG. 10B, two touch points are moved by different sizes in different directions. The size of the page, the sizes of the left and right pages, and the sizes of the upper and lower information display layers are changed according to the movement of the touch points.

It is assumed that two initial touch points of the touched page are M and N, touch points after movement are M' and N', a distance between a middle point C between M and N and a middle point C' between M' and N' is moved by p in an x axis and is moved by q in a y axis. If the touch points are moved by p in the x axis and by q in the y axis in order to move the page according to change in middle point, the coordinates (x1', y1'), (x2', y2') after movement become:

$(x1', y1')=(x1+p, y1+q)$ $(x2', y2')=(x2+p, y2+q)$

Change in the distance L between M and N and the distance L' between
M' and N' becomes S=L'/L.

If the coordinates obtained by changing the moved coordinates according to a distance ratio are (x1", y1"), (x2", y2"), the following equations are derived according to ratio change.

$x2''=s(x2'-x1')+x1''$ $y2''=s(y2'-y1')+y1''$

The following Equations are derived according to change in middle point.

$(x2''+x1'')/2=(x2'+x1')/2+p$ $(y2''-y1'')/2=(y2'-y1')/2+q$

If these equations are combined, the following equations are obtained.

Figure 10C:
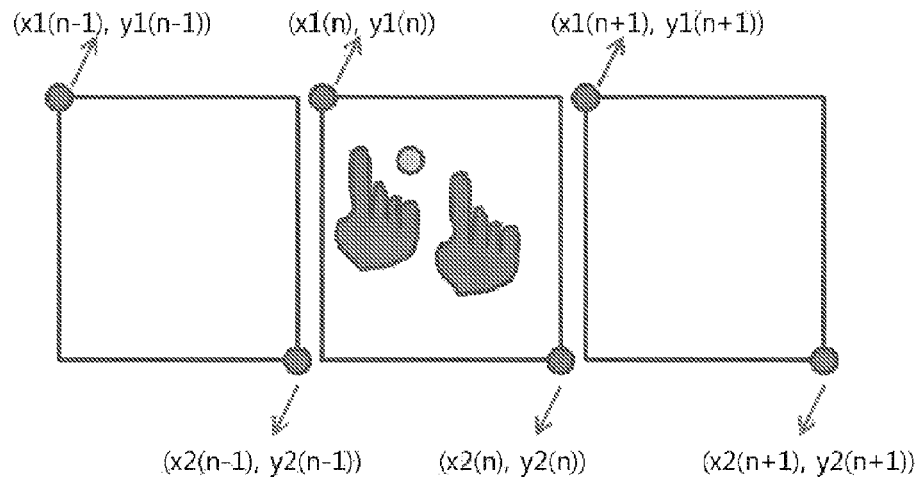
Figure 10D:
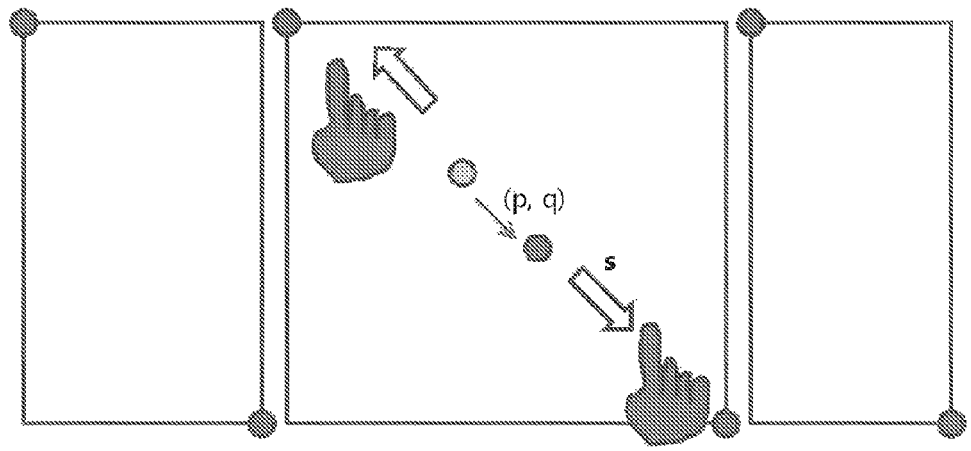

$x1''=1/2(1+s)\cdot x1+1/2(1-s)\cdot x2+p$ $y1''=1/2(1+s)\cdot y1+1/2(1-s)\cdot y2+q$ $x2''=1/2(1-s)\cdot x1+1/2(1+s)\cdot x2+p$ $y2''=1/2(1-s)\cdot y1+1/2(1+s)\cdot y2+q$ Referring to FIG. 10C, the coordinate information of (x1(n−1), y1(n−1)), (x2(n−1), y2(n−1)) of the left side and (x1(n+1), y1(n+1)), (x2(n+1), y2(n+1)) of the right side of the touched page are changed according to x1", y1", x2" and y2". Referring to FIG. 10D, the coordinates of the upper and lower information display layers are changed according to change in the touched page.

Figure 11A:
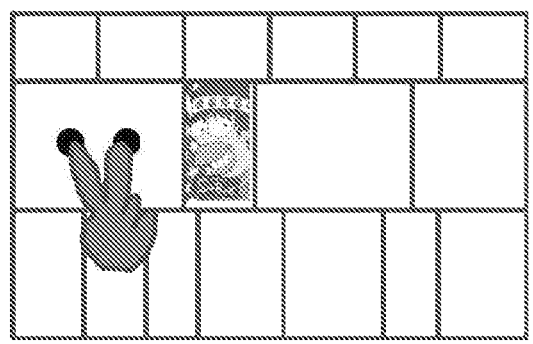
FIGS. 11A, 11B, and 11C are diagrams showing a screen output method upon touch of two points in the same direction according to an embodiment of the present invention.
Figure 11B:
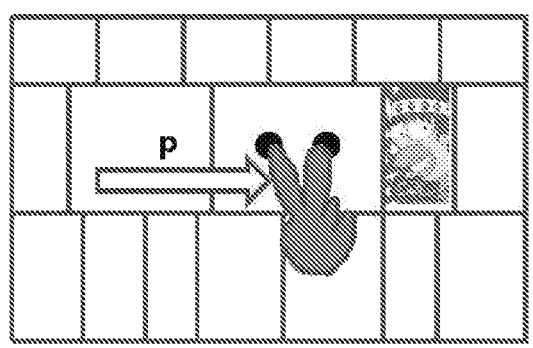
Figure 11C:
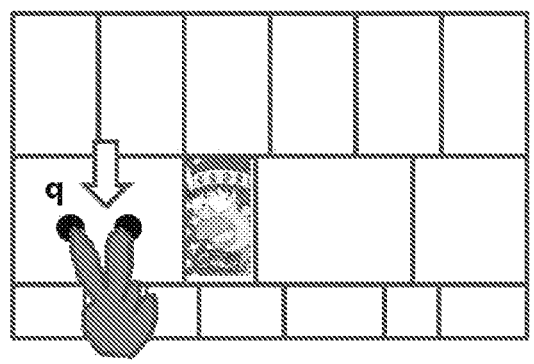

FIGS. 11A, 11B, and 11C are diagrams showing a screen output method upon touch of two points in the same direction according to an embodiment of the present invention. Referring to FIG. 11B, if the two touch points are moved along the information display layer at the same velocity, all the pages of the corresponding information layer may be moved regardless of the change in size of individual page. This may be represented by the following coordinates.

$(x1', y1')=(x1+p, y1)$ $(x2', y2')=(x2+p, y2)$

All the x components of the page are moved by p.

Referring to FIG. 11C, if the two touch points are moved in the vertical direction of the information display layer at the same velocity, the corresponding information layer may be vertically moved regardless of change in size of the individual page. This may be represented by the following coordinates.

$$(x1',y1')=(x1,y1+q)$$

$$(x2',y2')=(x2,y2+q)$$

All the y components of the page are moved by q.

Figure 12A:
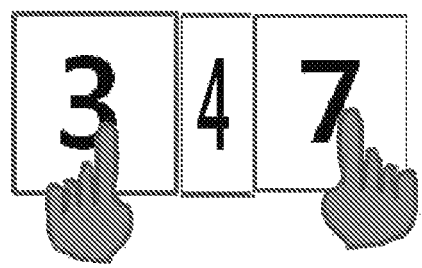
FIGS. 12A, 12B, and 12C are diagrams showing a screen output method upon touch of two points of individual pages according to an embodiment of the present invention.
Figure 12B:
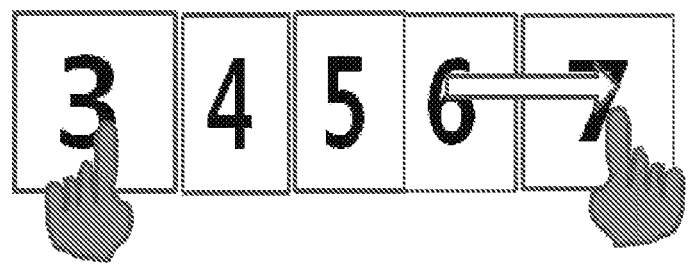
Figure 12C:
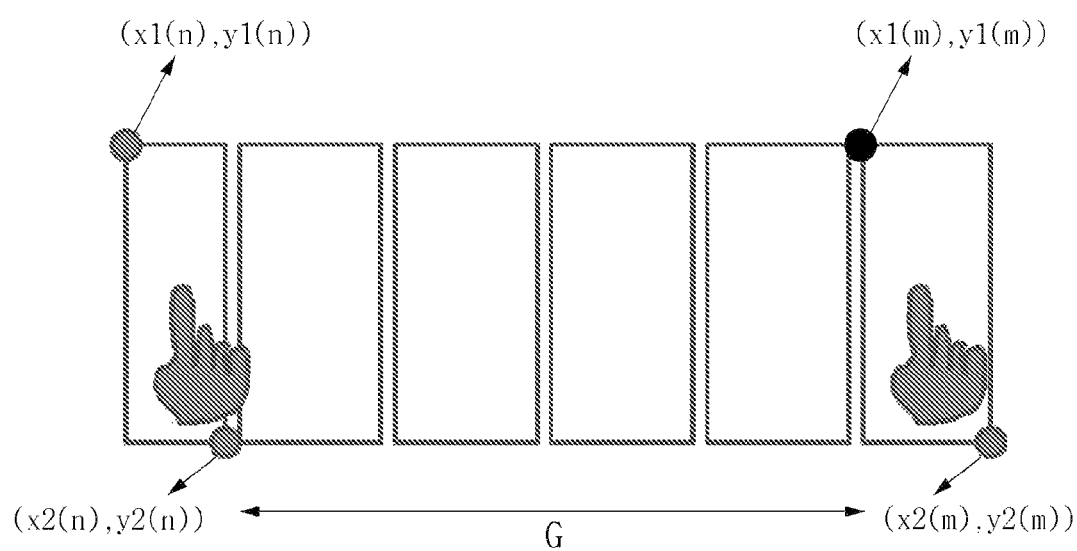

FIGS. 12A, 12B, and 12C are diagrams showing a screen output method upon touch of two points of individual pages according to an embodiment of the present invention. If two points of different pages are touched, the sizes of the pages interposed between both pages are equally divided and output on the screen. Referring to FIG. 12C, it is assumed that an n-th page and an m-th page are simultaneously touched. A distance between two pages may be defined as $G=x1(m)-x2(n)$. If the number of pages between the n-th page and the m-th page is Num, $(x2(n+i)', y2(n+1)')=(x2(n+1)+i \cdot G/num, y2(n+1))$ is obtained and i may be increased from 1 to $m-n-1$. The pages interposed between the n-th page and the m-th page may be output as pages having the same width G.

The embodiments of the present disclosure may be implemented in the form of a program command which may be performed through various computer components and may be recorded on a computer-readable recording medium. The computer-readable recording medium may include a program command, a data file, a data structure, and a combination thereof. The program command recorded on the computer-readable recording medium may be specially designed and configured for the present disclosure or known to those skilled in the computer software field. Examples of the computer-readable recording medium may include hardware apparatuses specially configured to store and execute a program command, such as a magnetic medium such as a hard disk, a floppy disk and a magnetic tape, an optical recording medium such as a CD-ROM and a DVD, a magneto-optical medium such as a floptical disk, a ROM, a RAM and a flash memory. Examples of the program command include machine language code made by a compiler or high-level language code executed by a computer using an interpreter or the like. The hardware apparatus may be configured to be operated as one or more software modules in order to perform the process of the present disclosure, and vice versa.

According to embodiments of the present disclosure, it is possible to maximize the number of pieces of content displayed on a restricted screen by arranging content in a line.

In addition, since a function for increasing or decreasing a large amount of content to appropriate sizes is provided and content is easily searched for and aligned, a user may intuitively, easily and rapidly operate a large amount of content.

Furthermore, since a plurality of information display layers is independently controlled, it is possible to provide an operation environment by dividing a screen to a plurality of screen portions according to user preference.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for displaying content, comprising:
    generating a page corresponding to a content file included in a folder;
    generating an information display layer including a folder display portion corresponding to the folder and the page;
    outputting the information display layer on a content display apparatus;
    sensing touch of the content display apparatus; and
    changing an output format of the information display layer based on the sensed touch,
    wherein changing the output format of the information display layer includes:
        if the sensed touch is a touch of one point of a first page in the information display layer and a touch of one point of a second page in the information display layer, equally dividing sizes of pages interposed between the first page and the second page and outputting the pages; and
        if the sensed touch is a one-point continuous touch of a first page in the information display layer, changing a size of a second page adjacent to the first page and moving an output position of the first page in a direction of the one-point continuous touch.

2. The method according to claim 1, wherein the generating the information display layer further includes aligning the folder display portion and the page of the information display layer in one direction.

3. The method according to claim 2, wherein the generating the information display layer further includes generating a plurality of information display layers.

4. The method according to claim 1, wherein the changing the output format of the information display layer includes, if the sensed touch is a one-point instantaneous touch, enlarging and outputting a page corresponding to the sensed point.

5. The method according to claim 2, wherein the changing the output format of the information display layer includes, if the sensed touch is a two-point continuous touch in different directions in one page, outputting the page and a page adjacent to the page based on the two-point continuous touch.

6. The method according to claim 2, wherein the changing the output format of the information display layer includes, if the sensed touch is a two-point continuous touch in the same direction in one page, moving output positions of all pages of the information display layer.

7. A content display apparatus, comprising:
    a display unit configured to display an information display layer including a folder display portion corresponding to a folder and a page corresponding to a content file included in a folder;
    a touch sensor configured to sense touch of the content display apparatus; and
    a conversion controller configured to change an output format of the information display layer based on the sensed touch, the conversion controller including a one-point touch controller to change the output format if the sensed touch is a one-point touch and a two-point touch controller to change the output format if the sensed touch is a two-point touch,
    wherein:
        if the sensed touch is a touch of one point of a first page and a touch of one point of a second page in the information display layer, the two-point touch controller equally divides the sizes of pages interposed between the first page and the second page and outputs the pages; and if the sensed touch is a one-point continuous touch of a first page in the information display layer, changing a size of a second page adjacent to the first page and moving an output position of the first page in a direction of the one-point continuous touch.

8. The content display apparatus according to claim 7, wherein the display unit aligns and outputs the folder display portion and the page of the information display layer in one direction.

9. The content display apparatus according to claim 8, wherein the display unit outputs a plurality of information display layers.

10. The content display apparatus according to claim 7, wherein, if the sensed touch is a one-point instantaneous touch, the one-point touch controller enlarges and outputs a page corresponding to the one-point instantaneous touch.

11. The content display apparatus according to claim 7, wherein, if the sensed touch is a two-point continuous touch in different directions in one page, the two-point touch controller outputs the page and a page adjacent to the page based on the two-point continuous touch.

12. The content display apparatus according to claim 7, wherein, if the sensed touch is a two-point continuous touch in the same direction in one page, the two-point touch controller moves output positions of all pages of the information display layer.

13. The content display apparatus according to claim 7, further comprising:

a file database configured to store the files; and
a conversion information database configured to store output information changed by the conversion controller.

14. A non-transitory computer-readable recording medium having recorded thereon a computer program for executing a method for displaying content, comprising:

generating a page corresponding to a content file included in a folder;
generating an information display layer including a folder display portion corresponding to the folder and the page;
outputting the information display layer on a content display apparatus;
sensing touch of the content display apparatus; and
changing an output format of the information display layer based on the sensed touch,
wherein changing the output format of the information display layer includes:
if the sensed touch is a touch of one point of a first page in the information display layer and a touch of one point of a second page in the information display layer, equally dividing sizes of pages interposed between the first page and the second page and outputting the pages; and
if the sensed touch is a one-point continuous touch of a first page in the information display layer, changing a size of a second page adjacent to the first page and moving an output position of the first page in a direction of the one-point continuous touch.

* * * * *